INVENTOR
VINCENT D. MULROONEY

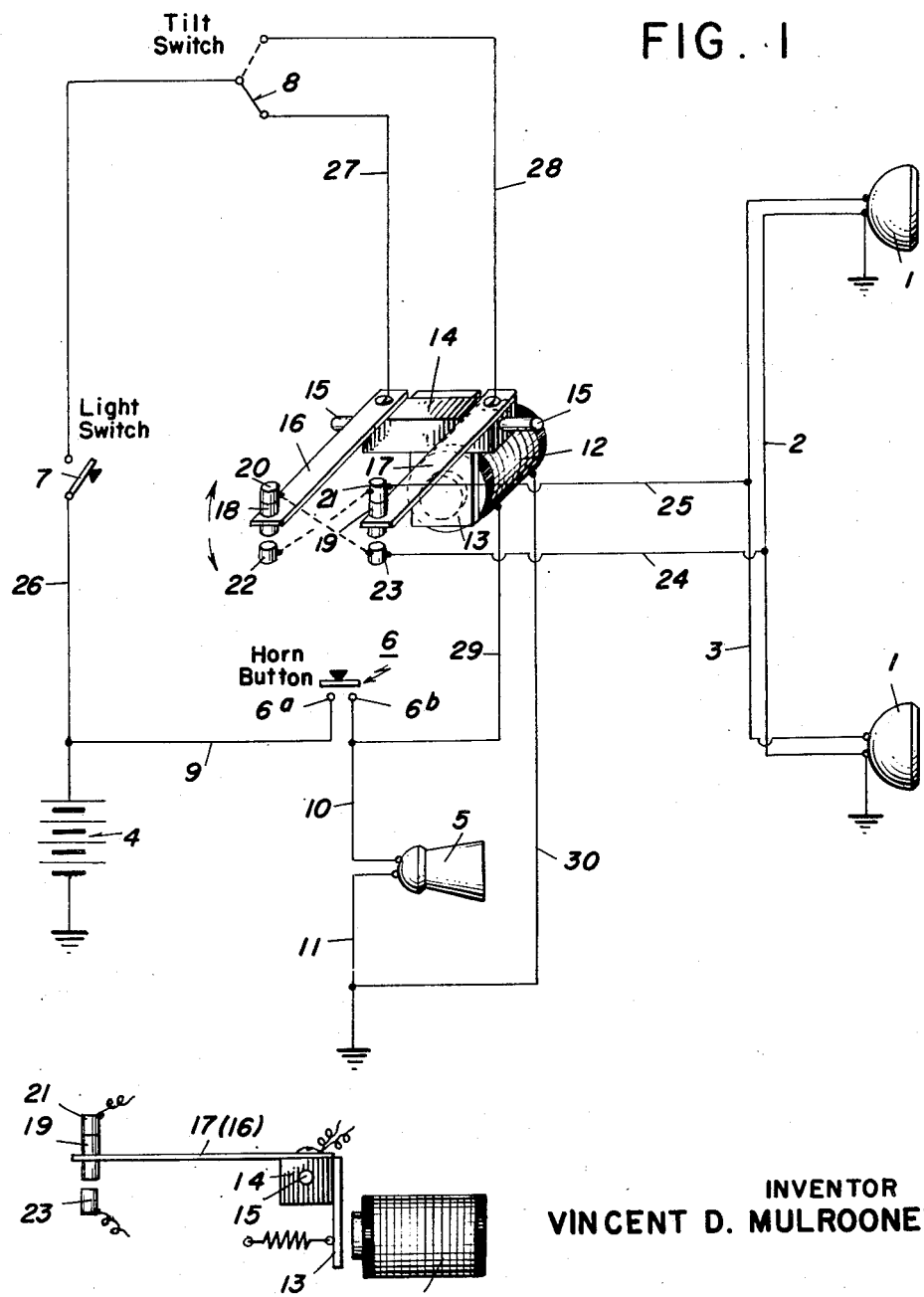

BY Stone, Boyden & Mack

ATTORNEYS

2,787,778

AUTOMOBILE SIGNALLING SYSTEMS

Vincent D. Mulrooney, Terre Haute, Ind.

Application April 23, 1954, Serial No. 425,100

2 Claims. (Cl. 340—75)

This invention relates to automobile signalling systems, and more particularly, to a system involving the usual horn and headlights.

It is the common practice to equip automobiles with headlights having both high and low beams, and to provide a tilt switch for shifting, at the will of the driver, the headlights from one beam to the other.

The general object of the present invention is to devise means operated by manipulation of the horn button or switch for automatically changing the headlights from one beam to another. This may be done by providing means either for shifting the lights from one beam to another at each operation of the horn button and horn, or for continuously shifting the lights alternately from one beam to the other so long as the horn button or switch remains closed.

A specific object is to provide means for automatically changing the lights regardless of the position of the tilt switch.

To this end, I connect the winding of a relay with the terminals of the horn, said relay being energized by actuation of the horn button, and controlling the shifting of the lights, independently of the tilt switch.

In order that the invention may be readily understood, reference is had to the accompanying drawing, forming part of this specification, and in which:

Fig. 1 is a diagram illustrating my improved signalling arrangement for shifting the lights once each time the horn button is actuated;

Fig. 2 is a side-elevation of the relay shown in Fig. 1;

Figure 3:
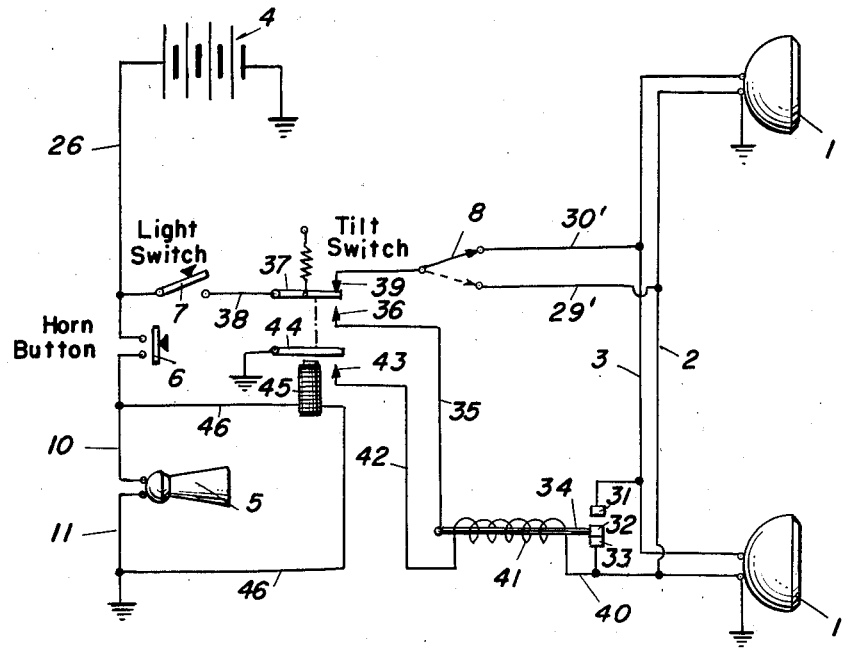
Fig. 3 is a diagram similar to Fig. 1, but showing an arrangement in which the lights are continuously shifted alternately from one beam to the other so long as the horn button or switch remains closed.

Referring to the drawings in detail, and more particularly first to Figs. 1 and 2, the usual headlights are indicated at 1, these headlights being equipped with both high and low beam filaments as is customary, supplied with current through the wires 2 and 3, one side of the circuit being grounded.

The battery is indicated at 4 and the horn at 5. The hand switch or horn button is shown at 6 as adapted to bridge and contacts 6a and 6b to complete the horn circuit. When this button is depressed, current flows from the battery 4 over wires 9, 10, and 11 through the horn 5 or through a relay controlling this horn.

The light switch is indicated at 7 and the usual tilt switch at 8, this switch being for the purpose of selecting either the high or low beam of the headlights as desired.

In my improved system, I make use of a relay having a magnet 12. This magnet has a winding which is connected by wires 29 and 30 in shunt across the terminals of the horn 5. Thus, when the horn button 6 is depressed and current flows from the battery, this current will divide, part going through the horn 5 and part going through the wires 29 and 30 and relay winding 12.

The armature of the relay magnet is indicated at 13 and this is rigidly secured to a block 14 provided at its ends with trunnions 15 by which it may be pivotally mounted in a suitable frame (not shown).

Also rigidly secured to the block 14 which is preferably of insulating material is a pair of arms 16 and 17 of metal or other conducting material. These arms carry at their ends contact points 18 and 19, which contact points play between and are adapted to engage either one of two pairs of fixed contacts 20, 21, and 22, 23. These pairs of contacts are cross connected as indicated in dotted lines in Fig. 1, that is to say, the contacts 20 and 23 are connected and the contacts 21 and 22 are connected. From the contact 21 extends a wire 25 to the light wire 3 and from the contact 23 extends a wire 24 to the light wire 2. The contacts of the tilt switch 8 are connected by wires 27 and 28 with the arms 16 and 17, respectively.

The operation of the system is as follows:

Assuming the tilt switch 8 to be in the position shown in full lines, when the light switch 7 is closed current flows from the battery 4 through wire 26, light switch 7 and tilt switch 8 through wire 27 to the arm 16. It then passes through the contact point 18 to the contacts 20 and 23 and thence through the wires 24 and 2 to the headlights. Assuming that the wire 2 supplies the high beam filaments, the lights will now be operating with a high beam. If now the horn button 6 is depressed, current flows from the battery as above described, not only through the horn but also through the relay magnet winding 12, thus energizing this magnet and attracting the armature 13. As the armature moves toward the magnet it rocks the block 14 on its pivots thus moving the arms 16 and 17 downwardly out of engagement with the contacts 20 and 21 and into engagement with the contacts 22 and 23. Current then flows from the tilt switch 8 through wire 27, arm 16, contacts 22 and 21, wire 25 and light wire 3, thus supplying the low beam filament with current. Meanwhile, the circuit to the high beam filament is broken at contact 20.

Thus depressing the horn button results in shifting the head lights from high beam to low beam.

As soon as the button 6 is released and the relay winding 12 de-energized, the contact arms are returned by a spring to the position shown in the drawings and thus restoring the high beam circuit.

If the tilt switch is in dotted line position, current will flow through wire 28 and arm 27, contact 21 and wire 25 to the low beam circuit wire 3. Then when the horn button is depressed and the relay energized, the circuit will be switched from the contact 21 supplying the low beam filaments to the contact 23 and wire 24 supplying the high beam filaments. Upon release of the button the parts are again returned to the position shown in the drawing and the low beam circuit restored.

It will be thus seen that regardless of the position of the tilt switch 8, operation of the horn 5 results in shifting the light circuit from high beam filaments to the low beam filaments or vice versa, so that as the horn button is pressed and released the headlights are caused to change beams, thus producing a flashing effect which adds to the effectiveness of the warning signal given by the horn. In other words, with my improved system, the operation of the usual horn button produces both a visible and audible signal, which is more apt to command attention than would either signal by itself.

Referring now to Fig. 3, I have illustrated an arrangement in which the lights, instead of being shifted once at each actuation of the horn button or switch, are continuously shifted alternately from one beam to the other, so long as the horn switch remains closed.

In this figure I have shown a contact 31 connected with wire 3, and a contact 33 connected with wire 2. Between these fixed contacts is a movable contact 32 carried at the end of a bi-metallic bar 34. This bar is connected by wire 35 with a contact point 36 adapted to be engaged by an armature 37, connected by wire 38 with the light switch 7. At the other side of this armature is another contact point 39, with which the armature is normally held in engagement by a suitable spring, the conact point 39 being connected with the tilt switch 8. The contacts of the tilt switch are connected by wires 29' and 30' with the light wires 2 and 3.

Surrounding the bi-metallic bar 34 is a heating coil 41, connected at one end by wire 40 with contact 33, and at the other end by wire 42 with a contact point 43, adapted to be engaged by an armature 44, which is grounded. The armatures 37 and 44 are mechanically connected, and are operated by a relay winding 45, connected by wires 46 to the wires 10, 11, in parallel with the horn 5.

When the light switch 7 is closed, current normally flows through the armature 37 and contact point 39 to tilt switch 8, and thence to the light wires 2 and 3. When, however, the horn button or switch 6 is closed, the horn is sounded, and at the same time the relay 45 is energized, thus, pulling down the armatures 37 and 44 into engagement with the contact points 36 and 43, respectively, and cutting out the tilt switch. Current then flows through armature 37, contact point 36, wire 35, bi-metallic bar 34, contacts 32, 33, wire 40, heating coil 41, wire 42, contact point 43, and armature 44 to ground. This causes the coil 41 to heat up, and this in turn causes the bi-metallic bar to bend so as to move contact 32 out of engagement with contact 33 and into engagement with contact 31. This shifts the light circuit from wire 2, supplying one filament, to wire 3 supplying the other filament, and, thus, causes the lights to change from one beam to the other.

At the same time, when contact 32 leaves contact 33, the circuit supplying current to the heating coil 41 is broken, and this coil cools off. Thereupon, the bar 34 bends down again, re-engaging contact 32 with contact 33, and the cycle is repeated. Thus, so long as the horn switch remains closed, and the relay 45 energized, the lights are continuously shifted alternately from one beam to the other.

When the horn button is released, and the relay 45 deenergized, the armature 37 restores the tilt switch to its normal operative condition.

Figure 4:
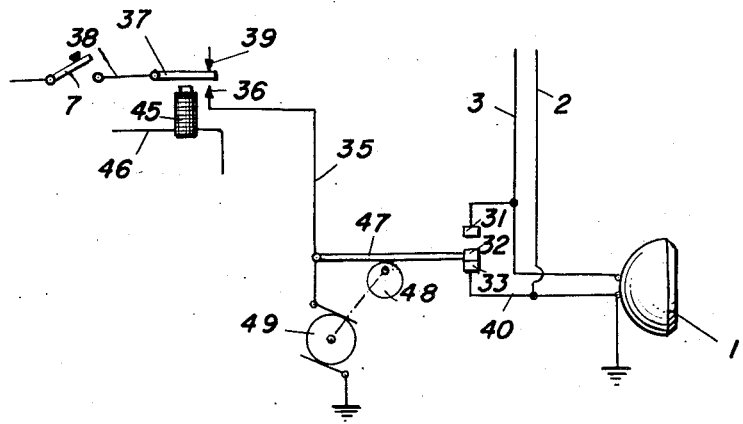
Fig. 4 is a fragmentary diagram showing a modification of the arrangement illustrated in Fig. 3.

Instead of using the thermal relay comprising the bi-metallic element and heating coil, I may accomplish the same result by employing the arrangement shown in Fig. 4.

In this modification, the contact 32 is carried by a pivoted arm 47, which rides upon a cam or eccentric 48, driven by a motor 49. It will be understood that suitable speed reducing gearing (not shown) is interposed between the motor and cam. Current is supplied to this motor and to the arm 47 through wire 35 and contact point 36, when the relay 45 is energized as before. It will be seen that as the cam or eccentric revolves, it will oscillate the arm 47, thus, moving the contact 32 alternately into and out of engagement with the contacts 31 and 33, thereby continuously shifting the lights from one beam to the other.

What I claim is:

1. In a motor vehicle, the combination with an electric horn, of the usual headlights having high and low beams, a tilt switch for shifting said headlights from one beam to the other, a manual switch for actuating said horn, a relay also controlled by said manual switch, and means operated by the energizing of said relay for changing said headlights from one beam to the other, regardless of the position of said tilt switch.

2. In a motor vehicle, the combination with an electric horn, of the usual headlights having high and low beams, a manual switch for energizing said horn, and automatic means for continuously shifting said headlights alternately from one beam to the other so long as said switch remains closed.

References Cited in the file of this patent

UNITED STATES PATENTS

| | | |
|---|---|---|
| 2,039,360 | Staley | May 5, 1936 |
| 2,579,292 | Brelsford | Dec. 18, 1951 |
| 2,590,606 | Golden | Mar. 25, 1952 |
| 2,734,181 | Warneck | Feb. 7, 1956 |